No. 646,919. Patented Apr. 3, 1900.
G. A. ROSS.
BICYCLE SADDLE.
(Application filed Mar. 25, 1899.)

(No Model.) 2 Sheets—Sheet 1.

WITNESSES INVENTOR,
George A. Ross.
BY
ATT'YS

No. 646,919. Patented Apr. 3, 1900.
G. A. ROSS.
BICYCLE SADDLE.
(Application filed Mar. 25, 1899.)

(No Model.) 2 Sheets—Sheet 2.

WITNESSES: Chas. G. Remington, M. Remington

INVENTOR George A. Ross, BY Geo. H. Remington & Co. ATT'YS

THE NORRIS PETERS CO., PHOTO-LITHO., WASHINGTON, D. C.

UNITED STATES PATENT OFFICE.

GEORGE A. ROSS, OF PROVIDENCE, RHODE ISLAND.

BICYCLE-SADDLE.

SPECIFICATION forming part of Letters Patent No. 646,919, dated April 3, 1900.

Application filed March 25, 1899. Serial No. 710,429. (No model.)

*To all whom it may concern:*

Be it known that I, GEORGE A. ROSS, a citizen of the United States of America, and a resident of Providence, in the county of Providence and State of Rhode Island, have invented certain new and useful Improvements in Bicycle-Saddles, of which the following is a specification.

In the improved bicycle-saddle forming the subject of my application for Letters Patent the object I have in view is to produce a saddle having comparatively great strength and stiffness, yet being light and resilient. Another advantage possessed by the saddle is that the seat portion may be readily detached from and attached to the holder, adjustably secured to the saddle-post, thereby to a certain extent providing the rider with means whereby he can easily render the bicycle unserviceable when desired—as, for example, when it is left unattended—thus lessening the liability of its being stolen.

My invention consists, essentially, in a separable saddle in which the seat portion is capable of being readily removed from the holder without detaching the holder from the saddle-post, as will be more fully described hereinafter.

Figure 1:
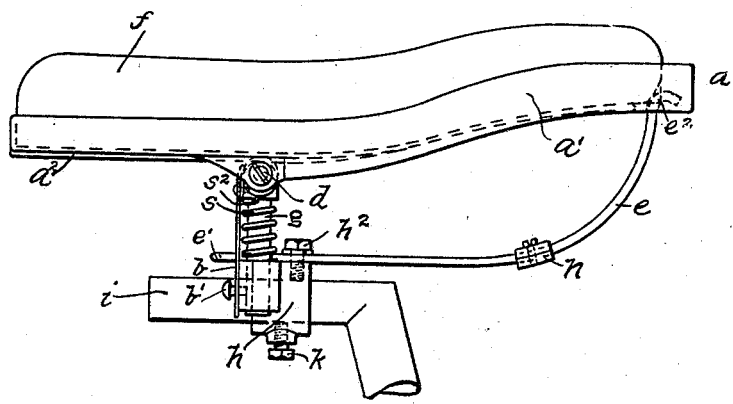
Figure 2:
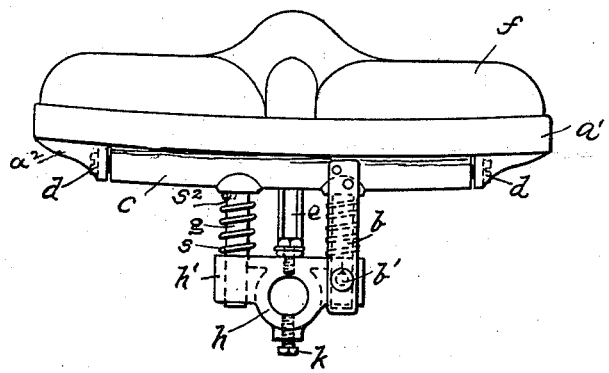
Figure 3:
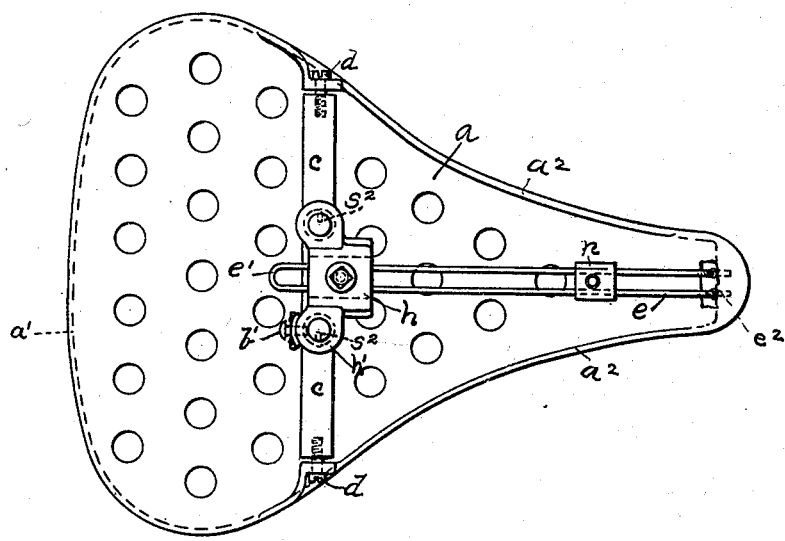
Figure 4:
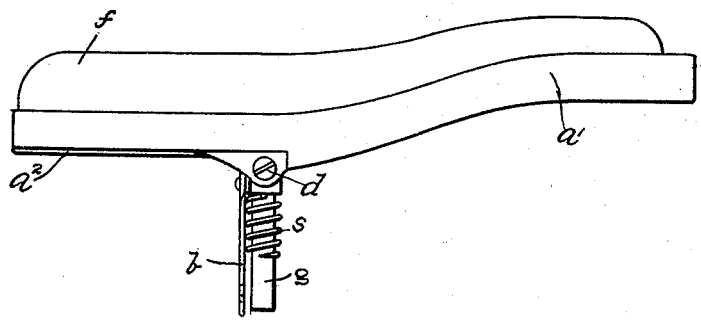

In the accompanying sheet of drawings, Figure 1 is a side elevation of my improved bicycle-saddle adjustably secured to the usual saddle-post. Fig. 2 is an end elevation. Fig. 3 is an inverted plan view. Fig. 4 is a side view of the seat portion detached from the holder and tilting-spring.

The novel features entering into the construction of my improved bicycle-saddle may be described as follows: The frame proper, $a$, may have any desired contour, although I prefer the form represented in the drawings. It has a circumscribing rim $a'$ on its upper side and a partial one, $a^2$, on its under side. It may be made of steel struck up or swaged or even of cast-aluminium or other suitable material. The seat-supporting surface may be suitably cut away or perforated, thereby reducing the weight of the frame. At or near the ends of said lower rims or flanges $a^2$ is located the stiff carrier-bar $c$, the same being arranged transversely of and in direct engagement with the under side of the frame $a$, as clearly shown in Fig. 2. The ends of said bar are pivoted to pins or screws $d$, passing through the flanges $a^2$. As thus arranged the frame is not deflected by the weight of the rider. The upper surface of the bar is rounded, thereby adapting the saddle to be tilted when desired. A holder or casting $h$ supports the said carrier-bar and frame $a$. The holder is adjustably mounted on the saddle-post $i$, screws $k$ maintaining it in position thereon. The holder is provided with oppositely-arranged ears or lugs $h'$, the same being drilled vertically to freely receive the two laterally-separated guide-rods $g$, secured to and depending from the under side of the carrier-bar. Each of the rods $g$ carries a spring $s$, interposed between and bearing against the adjacent faces of the said members $c$ and $h'$, as clearly shown, thereby providing a suitable degree of resiliency to the saddle.

The saddle may be adjustably tipped or tilted through the medium of a spring connection $e$. This member may be made of a single piece of wire. As drawn, it is bent to form a loop $e'$ at its rear end. The two sides or arms of the connection then extend, parallel with but separated from each other, to the forward end of the saddle, the free ends of the connection being bent to form open eyes $e^2$, which hook into holes formed in the corresponding end of the frame $a$. The member $e$ rests on top of the holder $h$, centrally between the rods $g$, and is securely held in position by means of a set-screw $h^2$. The sides of the connection are kept normally apart by the employment of a spreader $n$. Thus it will be seen that the saddle may be tilted by swinging its forward end up or down to the desired extent, followed by tightening the screw $h^2$.

The carrier-bar $c$ has a suitable flexible or elastic strap or connection $b$ secured thereto. The same extends downwardly and is detachably secured to the holder $h$ by means of a hook or catch $b'$. Now upon unhooking the lower end of the strap from the holder the saddle portion may then be readily and quickly removed from the bicycle, only the holder $h$ and the connection $e$ remaining on the saddle-post.

The advantage resulting from the use of a separable bicycle-saddle thus constructed is that it can be readily connected to or detached from the members $h$ and $e$ without any readjustment whatever of said members. When the rider desires to again connect or replace the saddle, he first inserts the ends $e^2$ of the connection $e$ into the frame $a$, followed by inserting the guide-rods $g$ into the holder $h$, at the same time attaching the strap $b$ to the holder, thus completing the operation.

In order that the springs $s$ be prevented from dropping off when the saddle is lifted from the holder, their upper ends may be bent and inserted each into a hole drilled in the guide-rods $g$, as shown at $s^2$.

The seat portion proper, $f$, may be made of leather or other suitable material, the same being upholstered or otherwise adapted to form a cushioned seat. It is inclosed within and conforms to the contour of the rim $a'$ and bears evenly upon the top surface of the frame $a$ and is secured thereto in any well-known manner.

I make no claim, broadly, to a resilient bicycle-saddle capable of being tilted and having a spring connection uniting the frame and holder portions.

I claim as my invention—

1. In a bicycle-saddle, the seat, the spring for supporting the front end of the seat and which spring has its front end detachably connected to the seat, the pivoted cross-piece on the under side of the seat, two guides $g$, and the two springs applied to the guides, combined with the holder member $h$, and the auxiliary connection or catch $b$ whereby when the connection or catch is detached from the holder $h$, the seat can be removed, substantially as shown.

2. In a bicycle-saddle, the seat, the pivoted cross-piece on the under side of the seat, and the guides extending from said cross-piece, in combination with the spring, having its front end detachably connected to and supporting the front end of the seat, the holder member $h$ having the rear end of said spring secured thereto, and having said guides slidably mounted in the holder, supporting-springs mounted on the guides interposed between the said cross-piece and holder, and the auxiliary connection or catch, arranged whereby when the said connection or catch is released or detached the seat can be readily removed from the said spring and holder $h$, substantially as described.

Signed by me at Providence, Rhode Island, this 23d day of March, 1899.

GEORGE A. ROSS.

Witnesses:
   GEO. H. REMINGTON,
   CHAS. C. REMINGTON.